77
DRAFTSMAN
SUBSTITUTED FOR MISSING COPY
J. Emerson,
Windlass.
No. 275.
A.1. Patented Apr. 3, 1860.
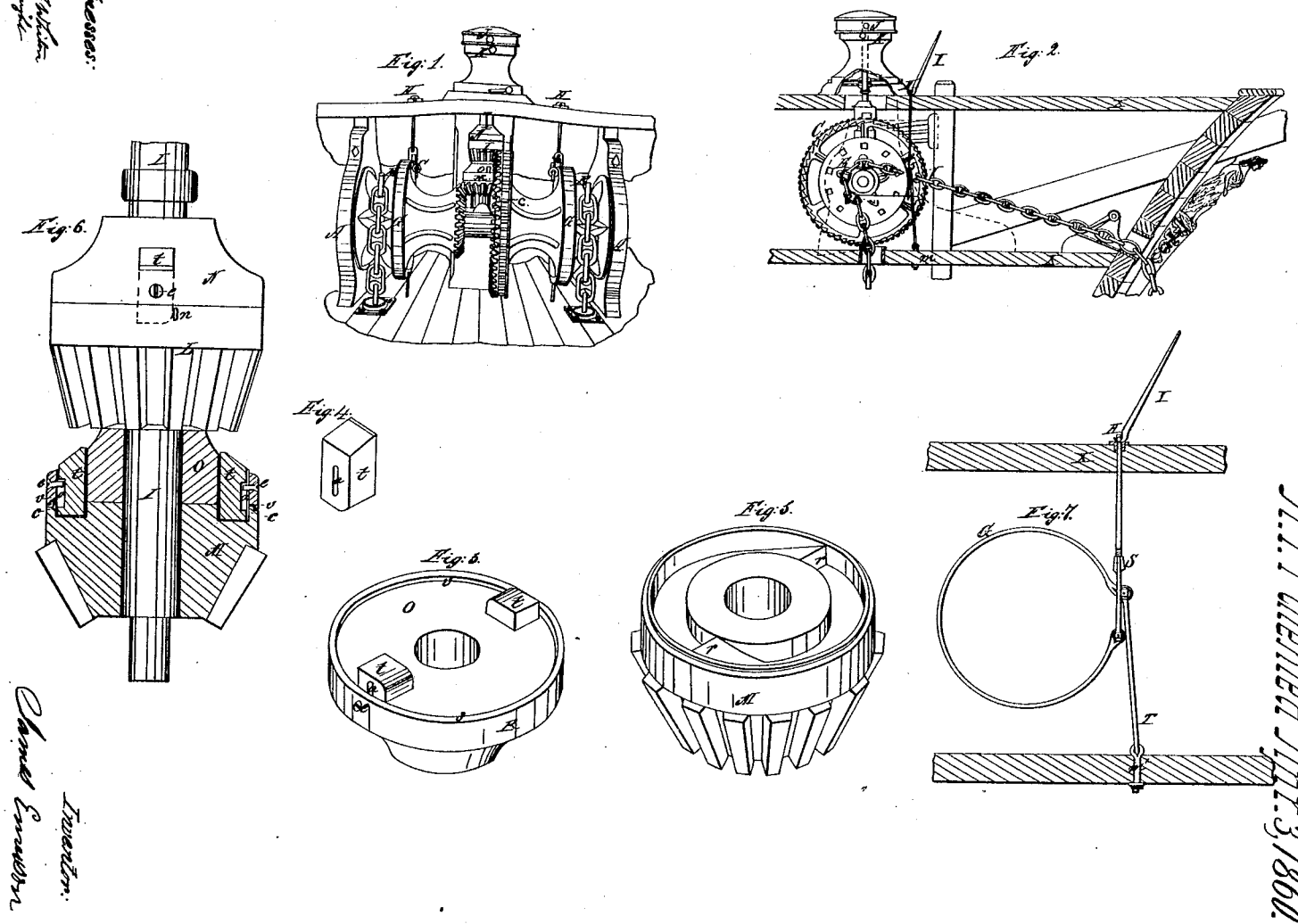
Witnesses:
Thomas J. Whiston
W. L. Wheaughe
Inventor:
James Emerson
AM. PHOTO-LITHO. CO. N.Y. (OSBORNE'S PROCESS)